United States Patent [19]

Von Feldt

[11] 4,390,927
[45] Jun. 28, 1983

[54] BICYCLE FLASHLIGHT HOLDER

[76] Inventor: Donald E. Von Feldt, R.R. 1, Duncombe, Iowa 50532

[21] Appl. No.: 379,928

[22] Filed: May 19, 1982

[51] Int. Cl.³ ............................................. F21V 33/00
[52] U.S. Cl. ..................................... 362/72; 362/191; 362/396
[58] Field of Search .......................... 362/72, 191, 396

[56] References Cited

U.S. PATENT DOCUMENTS

| 1,222,458 | 4/1917 | Peterson . | |
|---|---|---|---|
| 1,330,974 | 2/1920 | Bauman et al. . | |
| 1,344,073 | 6/1920 | Williams . | |
| 1,743,936 | 1/1930 | Segesser . | |
| 2,434,440 | 1/1948 | Schafranek . | |
| 3,148,473 | 9/1964 | Miller . | |
| 3,769,663 | 11/1973 | Perl . | |
| 4,170,337 | 10/1979 | Davis | 362/72 |

Primary Examiner—Stephen J. Lechert, Jr.
Attorney, Agent, or Firm—Henderson & Sturm

[57] ABSTRACT

Apparatus for selectively attaching a flashlight to bicycle handlebars, such bicycle handlebars being of a type having a central generally vertically extending shaft, a generally upwardly and horizontally forwardly extending connection structure connected to the top of the shaft, and a bar connected to the top front portion of said connection and extending to each side of the connection structure for providing handles for steering a bicycle. The attaching apparatus includes a base portion adapted to be disposed near the front top portion of the connection structure and overlying the center of the bar. A first resilient downwardly extending clamp is attached to one side of said base portion for extending around more than half of the circumference of a section of the bar on one side of the connection structure and for resiliently holding one end of the base portion in place. A second resilient downwardly extending clamp is attached to the other side of the base portion for extending around more than half of the circumference of a second section of the bar on the other side of the connection structure for resiliently holding the other side of the base portion in place. An upwardly extending flashlight clamping structure is attached to the base portion for extending around at least half of the circumference of a flashlight for holding such flashlight in place while the bicycle is being ridden. A rotation prevention mechanism is attached to the base portion and extends above and below the connection structure for preventing the base portion and thereby the flashlight from rotating out of the predetermined position.

5 Claims, 5 Drawing Figures

U.S. Patent  Jun. 28, 1983  4,390,927
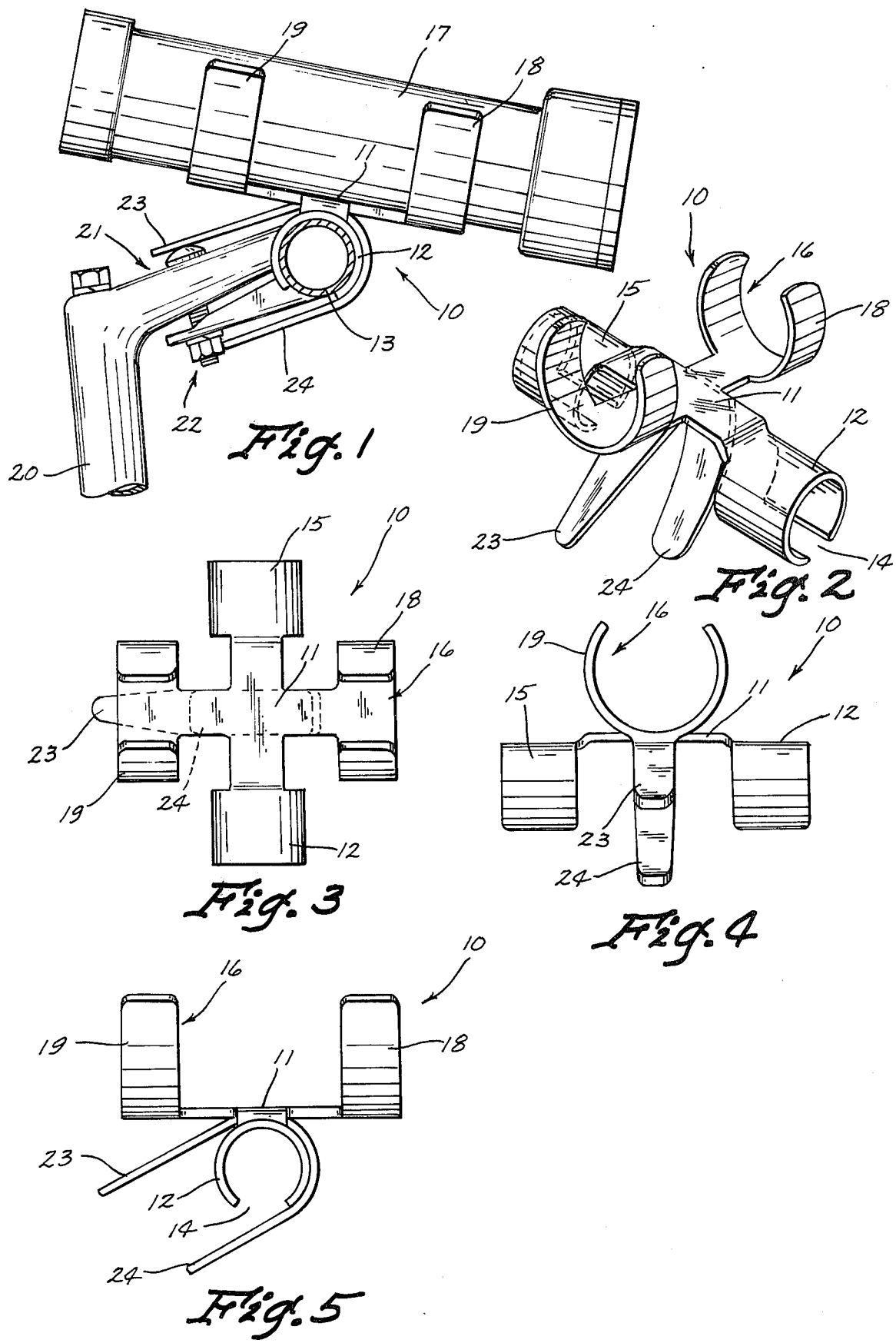

4,390,927

BICYCLE FLASHLIGHT HOLDER

BACKGROUND OF THE INVENTION

The present invention relates generally to an apparatus for attaching a flashlight to a bicycle, and more particularly to such apparatus which is quickly and easily removable or attachable to a bicycle and which dependably holds the flashligth in a position to function like a headlight for a bicycle so it can be ridden at night.

The idea of attaching a flashlight to the handlebars of a bicycle is not new. For example, see U.S. Pat. No. 1,222,458 to Peterson and U.S. Pat. No. 1,743,936 to Segesser, both of which show a flashlight holder which is designed to be bolted to a bicycle handlebar.

The problem with such prior art structures is that they are not easily attachable and they are not easily detachable. It is quite undersirable to have metal structures such as shown in the above two mentioned prior art patents sticking up from a bicycle handlebar at all times since such structures become a safety hazard, especially when not in use. But it requires tools such as a wrench, screwdriver, pliers, or the like to attach or disconnect these prior art structures from and to bicycle handlebars. Furthermore, even if such devices are to be removed from the bicycle during daylight hours, there's no place on the bicycle to store such structures so that they will be available when it is necessary to use them.

Consequently, there is a need for a flashlight attaching structure for bicycle handlebars which is easily and quickly attachable, easily and quickly detachable, and can be readily stored on a bicycle for being readily accessible when it becomes dark and is needed.

SUMMARY OF THE INVENTION

The present invention relates to an apparatus for selectively attaching a flashlight to bicycle handlebars, such bicycle handlebars being of a type having a central generally vertically extending shaft, a generally upwardly and horizontally forwardly extending connection structure connected to the top of the shaft, and a bar connected to the top front portion of said connection and extending to each side of the connection structure for providing handles for steering a bicycle. The attaching apparatus includes a base portion adapted to be disposed near the front top portion of the connection structure and overlying the center of the bar. A first resilient downwardly extending clamp is attached to one side of said base portion for extending around more than half of the circumference of a section of the bar on one side of the connection structure and for resiliently holding one end of the base portion in place. A second resilient downwardly extending clamp is attached to the other side of the base portion for extending around more than half of the circumference of a second section of the bar on the other side of the connection structure for resiliently holding the other side of the base portion in place. An upwardly extending flashlight clamping structure is attached to the base portion for extending around at least half of the circumference of a flashlight for holding such flashlight in place while the bicycle is being ridden. A rotation prevention mechanism is attached to the base portion and extends above and below the connection structure for preventing the base portion and thereby the flashlight from rotating out of a predetermined position.

An object of the present invention is to provide an improved flashlight holder for attachment to bicycle handlebars.

Another object of the invention is to provide a flashlight holder for handlebars which is easy to connect to bicycle handlebars and is easy and simple to disconnect.

A further object of the invention is to provide an apparatus for attaching a flashlight to bicycle handlebars which is economical to produce and dependable to use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view of the present invention attached to bicycle handlebars;

FIG. 2 is a perspective view of the apparatus for attaching the flashlight to bicycle handlebars;

FIG. 3 is a top plan view of the preferred embodiment of the present invention;

FIG. 4 is a rear view of the preferred embodiment of the present invention; and

FIG. 5 is a side elevational view of the present invention, the opposite side view being identical to the side shown in FIG. 1.

DESCRIPTION OF THE PREFERRED EMBODIMENT

Referring now to the drawings wherein like reference numerals designate identical of corresponding parts throughout the several views, FIG. 1 shows a bicycle flashlight holder connection apparatus 10 constructed in accordance with the present invention. The flashlight holder connection apparatus 10 includes a base portion 11 located centrally of the apparatus 10. This base portion 11 includes a first resilient downwardly extending clamp 12 connected on one side of the base portion 11 for extending around more than half of the circumference of a section of a handlebar 13. The first resilient clamp 12 is constructed of the same material which will bend outwardly to be received over the handlebar 13 by pushing the handlebar 13, through an opening 14 in the clamp 12. Although the flashlight holding apparatus 10 is constructed of one piece as shown in the preferred embodiment, it will be understood to those skilled in this art that it can be constructed of composite parts instead, and be fully equivalent thereto. A second resilient downwardly extending clamp structure 15 is disposed on the other side of base portion 11 and extends over a section of the handlebar 13 in the same manner as the first clamp structure 12.

An upwardly extending flashlight clamping mechanism 16 is also attached to the base portion 11 for extending around and attaching to more than half the circumference of a flashlight 17. The front portion 18 of the flashlight clamping structure 16 holds the front of the flashlight 17 and a rear clamping structure 19 holds a rear portion of the flashlight 17. The clamps 18 and 19 are similar to the clamps 12 and 15 which attach to the handlebar 13, in that the size of the original opening inside the clamps 18 and 19 made of a size slightly smaller than the circumference of flashlight 17 which is being held (FIG. 1) so that when flashlight 17 is pushed down through the top opening of the clamps 18 and 19, the resiliency of the clamps 18 and 19 themselves will securely hold flashlight 17 by friction in position shown in FIG. 1.

The bicycle (not shown) has a central generally vertically extending shaft 20 and a generally upwardly and horizontally forwardly extending connection structure 21 which attaches the top of the vertically extending shaft 20 to the handlebar section 13, as is conventional in the bicycle art. A nut and bolt assembly 22 secures the connection structure 21 around the bicycle handlebar 13 so that, by friction, the handlebar 13 is prevented from rotation with respect to the connection structure 21 and with respect to the vertical shaft 20.

An important feature of the present invention is the inclusion of rotation prevention structure for the apparatus 10 and this rotation prevention structure is comprised of a first resilient center projection apparatus 23 extending from the front of the base portion 11 for abutment with the top front portion of the connection structure 21. A second resilient center projection 24 extends downwardly and rearwardly from the front of the base portion 11 for being in abutment with the lower portion of the connection structure 21; specifically it would normally be in abutment with the nut and bolt assembly 22 for preventing the apparatus 10 from rotating. This feature is extremely important because the weight of the flashlight 17 is difficult to balance on the bicycle handlebars 12; and, since the weight will tend to be either forward or rearward of the handlebar 13, the projection 23 will prevent the rear part of the flashlight 17 from rotating downwardly about on the left of the handlebar section 13 as viewed in FIG. 1 and the projection 24 will prevent the flashlight 17 and the apparatus 10 associated therewith from rotating downwardly on the right of handlebar section 13, as viewed in FIG. 1. Consequently, the flashlight 17 can be held in an optimum position with no danger of it moving from such optimum position while the bicycle is being ridden. Ideally, the apparatus 10 is constructed such that the flashlight 17 will shine a beam of light on the ground about 15 or 20 feet ahead of the bicycle, but it is to be understood that the present invention can be used to position a flashlight in whatever direction is desired and still be within the inventive concept of the present invention.

When it is desired to store the apparatus 10, for example in the daytime, the apparatus is simply pulled off of the handlebars 13 and then reattached on some other out-of-the-way tubular member on the bicycle, until it becomes dark and is needed again.

Consequently, it can be readily seen that the preferred embodiment 10 does indeed accomplish the objects set forth above. Obviously, many modifications and variations of the present invention are possible in light of the above teachings. It is therefore to be understood that, within the scope of the appended claims, the invention may be practiced otherwise than as specifically described. For example, a radio, dog repellent spray can or the like can be held by the apparatus 10 and still be within the scope of these claims.

I claim:

1. Apparatus for selectively attaching a flashlight to bicycle handlebars, said bicycle handlebars being of a type having a central generally vertically extending shaft, a generally upwardly and horizontally forwardly extending connection structure connected to the top of the shaft, and a bar connected to the top front portion of said connection structure and extending to each side of said connection structure for providing handles for steering a bicycle, said apparatus comprising:
   a base portion adapted to be disposed near the front top portion of the connection structure and overlying the center of said bar;
   a first resilient downwardly extending clamp means attached to one side of said base portion for extending around more than half of the circumference of a section of said bar on one side of said connection structure and for resiliently holding one end of said base portion in place;
   a second resilient downwardly extending clamp means attached to the other side of said base portion for extending around more than half of the circumference of a second section of said bar on the other side of said connection structure for resiliently holding the other side of said base portion in place;
   an upwardly extending flashlight clamping means attached to said base portion for extending around at least half of the circumference of a flashlight for holding a flashlight in place while the bicycle is being ridden; and
   rotation prevention means attached to said base portion and extending above and below said connection structure for preventing said base portion and thereby said flashlight from rotating out of a predetermined position, whereby a bicycle can be ridden at night by using said apparatus with a common flashlight as a headlight.

2. The apparatus of claim 1 wherein said flashlight clamping means comprises a front means attached to a front portion of said base portion for resiliently clamping a front portion of a flashlight and a rear means attached to a rear portion of said base portion for resiliently clamping a rear portion of the flashlight.

3. The apparatus of claim 1 wherein said rotation prevention means further comprises a first resilient center projection means extending downwardly and rearwardly from the rear of said base portion for abutment with a top front portion of said connection structure and a second resilient center projection means extending downwardly and rearwardly from the front of the base portion for abutment with a lower portion of said connection structure.

4. The apparatus of claim 3 wherein said connection structure includes a fastening means for attaching said bar to said second structure and further including a nut and bolt assembly, a lowest and front most portion of said second resilient projection means being in abutment with said nut and bolt assembly.

5. The apparatus of claim 4 wherein said apparatus is comprised of a one piece resilient plastic material.

* * * * *